J. H. SANDMEYER.
Watchmaker's Lathe.
No. 209,361. Patented Oct. 29, 1878.
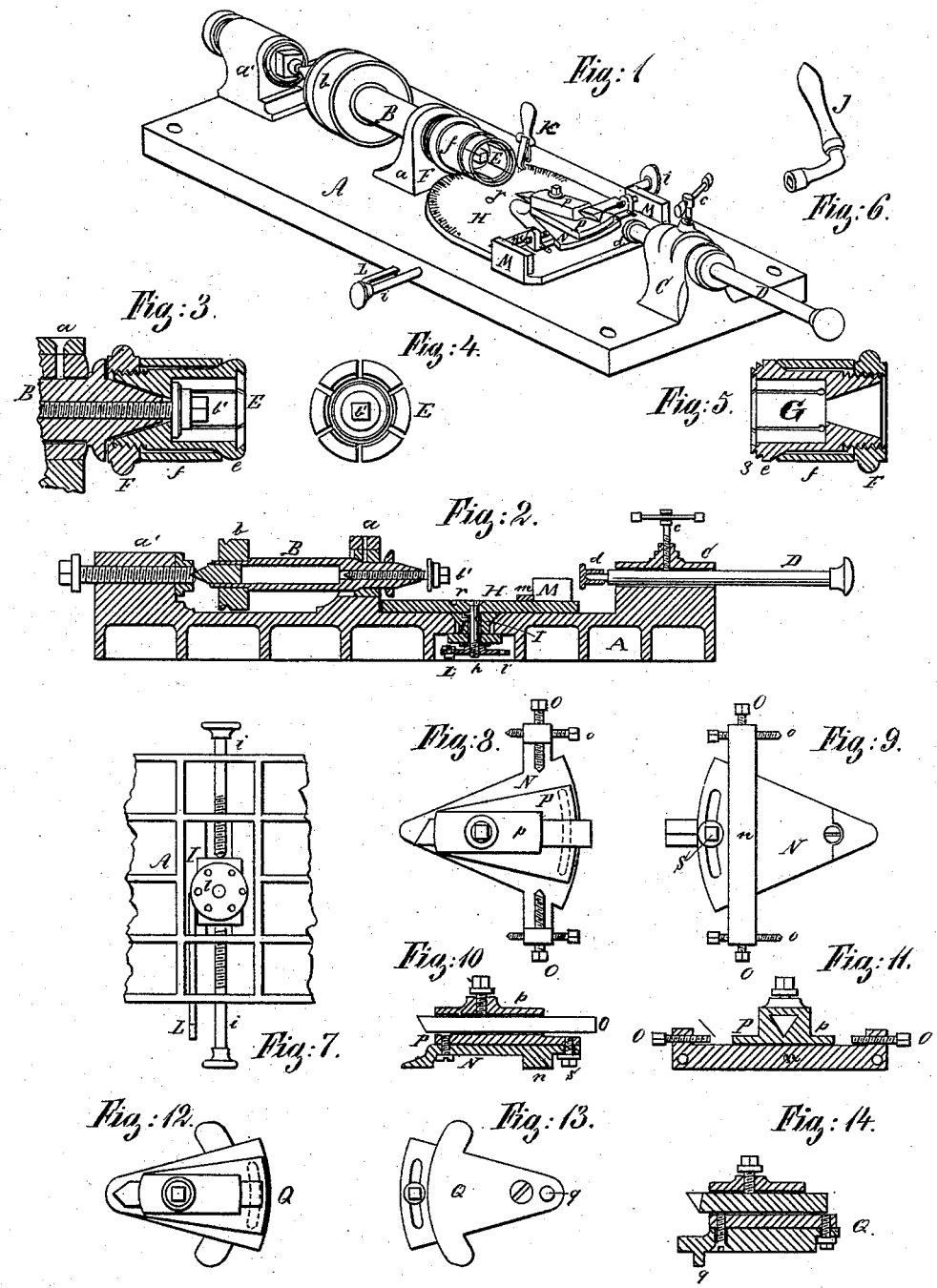
Witnesses:
C. Jebson.
Emil H. Frommann
Inventor:
J. Heinrich Sandmeyer
By Wm. H. Lotz
Attorney

UNITED STATES PATENT OFFICE.

J. HEINRICH SANDMEYER, OF CHICAGO, ILLINOIS.

IMPROVEMENT IN WATCH-MAKERS' LATHES.

Specification forming part of Letters Patent No. 209,361, dated October 29, 1878; application filed July 16, 1878.

*To all whom it may concern:*

Be it known that I, J. HEINRICH SANDMEYER, of Chicago, in the county of Cook and State of Illinois, have invented new and useful Improvements in Watch-Case Turning-Lathes, of which the following is a true and accurate description, reference being had to the accompanying drawing, and to the letters of reference marked thereon.

The nature of my invention relates to a tool by which watch-cases are turned; and it is the object of my invention to so construct the same that after true adjustment an inexperienced hand can do the work very rapidly, and cannot do otherwise but bring out all watch-cases alike.

In the drawing, Figure 1 represents an exterior perspective view of the lathe complete. Fig. 2 represents a longitudinal vertical section through the center line of the same; Fig. 3, an enlarged sectional view of the end of the spindle and of the chuck for grasping the watch-case externally. Fig. 4 represents an end view of the chuck; Fig. 5, a longitudinal section of the chuck for holding the watch-case internally. Fig. 6 represents the crank-wrench for securing the chucks upon the spindle. Fig. 7 represents a bottom view of that portion of the lathe-bed to which the turn-table is adjustably secured. Figs. 8 and 9 represent top and bottom views of the sliding tool-holder, and Figs. 10 and 11 vertical longitudinal and cross-sections of the same; and Figs. 12, 13, and 14 represent top and bottom views and a longitudinal vertical section of the pivotal tool-holder.

A is the lathe-bed, having cast upon one end the head-stocks $a$ $a'$, for holding the spindle B, which carries driving-pulley $b$ in the usual manner, and having at its opposite end the puppet-head C, also cast solid with the bed, which holds the puppet-bar D, having cap $d$ loosely pivoted upon its end. This bar D is longitudinally adjustable, and is secured in any desirable position by a set-screw, $c$.

The spindle B is hollow, and its front end is made conical to enter the chucks, which are firmly secured upon it by a screw, $b'$, engaging with an axial screw-threaded hole in said spindle end, to be driven by a crank-wrench, J.

The chuck E has a conical socket to fit upon the conical end of the lathe-spindle, and its front end is bored out cylindrically and is longitudinally split into segments of equal size by being diametrically slotted, so as to provide for expansion and contraction of its end. The front end of the chuck has a swell, forming a conical shoulder, $e$; and a sleeve, $f$, being chamfered internally at its front end to engage with and bear upon the conical shoulder $e$, is tightened upon said shoulder by a nut, F, fitted upon the screw-threaded rear end of said chuck, so that said chuck can be contracted thereby to assume a smaller diameter, and when released will expand and regain its former diameter. This chuck E also has a small internal recess or annular groove in its front end, which is intended for admitting and holding the external rim of the watch-case by contracting the chuck after the same has been inserted.

The chuck G is of exactly the same construction as the chuck E, with the only exception that its front external edge, $g$, is grooved for securing the watch-case upon it by first contracting the chuck to enter the rim edge of said case, and then by releasing the same to expand into and hold said watch-case by the spring-power of its several segments.

The puppet-bar D is only used in connection with a wooden chuck for holding the watch-case against said chuck.

H is a horseshoe-shaped turn-table, resting upon the top face of the lathe-bed, with its fulcrum-pin $h$ fitted into a block, I, which is transversely movable in a slot in the lathe-bed, so that said turn-table can be shifted away from the center of the bed in either direction, and is adjusted and secured in its desired position between two set-screws, $i$ $i$, tapped through the bottom ribs of the lathe-bed, and butting against the block I from opposite directions. This turn-table H also is capable of revolving on its fulcrum-pin, so as to be adjustable to any desirable angle. Graduations are sunk in its semicircular edge for engaging with the pointed edge or end of a spring, K, which is secured upon the lathe-bed, and is provided with a suitable lever-handle for raising it off the turn-table. Said turn-table, after it has been adjusted, is held from rotary motion by the bottom end of the fulcrum-pin $h$, being screw-threaded and provided with a nut, $l$, forming the hub of a disk, which has a series of holes near its periphery, with one of which a rod, L, is coupled, which is passed through openings in the lathe-bed to the exterior of the same, where it is provided with a ring-handle. This rod L, by being pushed into the lathe-bed, will release the turn-table, which, after true adjustment, is secured in its position by pulling the rod L outward, whereby the nut $l$ is tightened and the turn-table is brought to bear solid upon the bed.

A spline, $m$, projects from the face of the turn-table, extending from edge to edge of the same, which forms the guide for the tool-holders, and two lugs, M, rise from the squared ends of said turn-table, which act as stops for limiting the movement of said tool-holders.

The tool-holder, Figs. 8, 9, 10, and 11, consists of a segmental plate, N, having on its bottom face a projecting rib, $n$, at right angles with its radial center, which rib extends beyond the edges of the plate, and has lugs to the top of its ends for set-screws O in line with said rib, while set-screws $o$ are tapped through the ends of the rib at right angles with the screws O. The acute end of this plate is thickened on its bottom, so as to be flush with the rib $n$, and forms the pivotal center for the tool-holder P, which consists of a segmental plate, having a prismatic tool-receptacle, $p$, on its top face, provided with a set-screw for holding the tool; and close to its segmental periphery it has a stud, S, projecting downward from its bottom, which enters and passes through an arc-shaped slot in the plate N, and has a nut and washer to its end for adjusting and holding the tool at any desirable angle with said plate N. This tool-holder N is placed upon the turn-table H, and is pushed by hand toward the casing-blank as far as the set-screws $o$ will permit until the same impinge against the spline $m$, while its distance of facing off the said casing is limited by the set-screws O and lugs M.

Figs. 12, 13, and 14 represent another tool-holder, Q, similarly constructed to the one described before, only that it has a perfectly-smooth bottom face, with a pin, $q$, projecting downward from near its acute corner, which is to engage with a hole, $r$, in the face-plate, so as to revolve around the same. This tool-holder is used for turning small rounded surfaces or beads on the watch-cases, and requires no set-screws for limiting its motions. The turn-table only requires to be adjusted for bringing the center in the right position around which the tool is to swing.

The *modus operandi* for using this lathe is as follows, to wit: A series of tool-holders, like the ones described, being provided for each lathe, each of which tool-holders holds a turning-tool, and is adjusted to face a particular portion of the watch-case, (the being arranged on shelves according to the consecutive service of each holder, and also with each holder, the position and the degree of angle to which the turn-table is to be adjusted being noted down,) a lot of watch-case blanks are one by one chucked in the lathe to be turned only in one particular place with one of the tool-holders, and then by the next, the turn-table being re-adjusted for every change of the tool-holders until the watch-cases are turned over all.

The operation of this tool is very perfect without requiring particular attention, and is so rapid that one operator can turn out as much work as will enable him to compete with six skillful mechanics doing the same work in the now usual manner.

What I claim as my invention is—

1. The combination, with the lathe-bed A, having head-stocks and spindle, of the turn-table H, constructed with a graduated edge, and provided with spline $m$ and lugs M, the indicator-spring K, adjustable block I, fulcrum-pin $h$, disk-nut $l$, and rod L, substantially as and for the purpose set forth.

2. In combination with a turning-lathe and with the turn-table H arranged upon it, and having spline $m$ and lugs M, a tool-holder composed of plate N, having rib $n$ and set-screws O and $o$, and of plate P, having tool-receptacle $p$ and stud S, the same to be constructed, arranged, and operating substantially in the manner and for the purpose set forth.

J. HEINRICH SANDMEYER.

Witnesses:
E. JEBSEN,
EMIL H. FROMMANN.